(12) United States Patent
Belousov et al.

(10) Patent No.: US 11,217,416 B2
(45) Date of Patent: Jan. 4, 2022

(54) PLASMONIC PHOTOCATHODE EMITTERS

(71) Applicant: KLA CORPORATION, Milpitas, CA (US)

(72) Inventors: Sergei Belousov, Milpitas, CA (US); Andrey Knizhnik, Milpitas, CA (US); Inna M. Iskandarova, Milpitas, CA (US); Boris Potapkin, Milpitas, CA (US); Katerina Ioakeimidi, San Francisco, CA (US); Gildardo R. Delgado, Livermore, CA (US); Frances Hill, Sunnyvale, CA (US); Gary V. Lopez Lopez, Sunnyvale, CA (US); Miguel Gonzalez, Livermore, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 17/029,501

(22) Filed: Sep. 23, 2020

(65) Prior Publication Data

US 2021/0098223 A1    Apr. 1, 2021

Related U.S. Application Data

(60) Provisional application No. 62/907,502, filed on Sep. 27, 2019.

(51) Int. Cl.
*H01J 1/34* (2006.01)
*G02B 5/00* (2006.01)

(52) U.S. Cl.
CPC ............ *H01J 1/34* (2013.01); *G02B 5/008* (2013.01); *H01J 2201/3423* (2013.01)

(58) Field of Classification Search
CPC .................................. H01J 1/34; G02B 5/008
See application file for complete search history.

(56) References Cited

U.S. PATENT DOCUMENTS

| | | | |
|---|---|---|---|
| 2005/0264148 A1* | 12/2005 | Maldonado | H01J 37/073 313/103 R |
| 2005/0285128 A1 | 12/2005 | Scherer et al. | |
| 2008/0042563 A1* | 2/2008 | Niigaki | H01J 40/06 313/542 |
| 2010/0139771 A1* | 6/2010 | Schwede | H02S 99/00 136/261 |

(Continued)

FOREIGN PATENT DOCUMENTS

| | | |
|---|---|---|
| KR | 20120065641 A | 6/2012 |
| WO | 2019124114 A1 | 6/2019 |

OTHER PUBLICATIONS

Polyakov, et al., "Plasmon-Enhanced Photocathode for High Brightness and High Repetition Rate X-Ray Sources," Phys. Rev. Lett., 110, 076802, Feb. 11, 2013, 5 pages.

(Continued)

*Primary Examiner* — Mariceli Santiago
(74) *Attorney, Agent, or Firm* — Hodgson Russ LLP (57) ABSTRACT

A photocathode emitter includes a transparent substrate, a photocathode layer, and a plasmonic structure array disposed between the transparent substrate and the photocathode layer. The plasmonic structure array is configured to operate at a wavelength from 193 nm to 430 nm. The plasmonic structure array can be made of aluminum. An electron beam can be generated from a light beam directed at the plasmonic structure array of the photocathode emitter.

19 Claims, 9 Drawing Sheets

(56) References Cited

U.S. PATENT DOCUMENTS

| | | | |
|---|---|---|---|
| 2014/0360564 A1* | 12/2014 | Ng | H01G 9/2072 |
| | | | 136/254 |
| 2017/0076907 A1* | 3/2017 | Matsuki | H01J 37/20 |
| 2017/0133631 A1 | 5/2017 | Thompson et al. | |
| 2020/0266019 A1 | 8/2020 | Ioakeimidi et al. | |

OTHER PUBLICATIONS

Gerard & Gray, Aluminium Plasmonics, J. Phys. D: Appl. Phys., 2015, 48, 184001.
WIPO, International Search Report for PCT/US2020/052598, dated Jan. 12, 2021.

* cited by examiner

FIG. 1

Light impinging direction

PLASMONIC PHOTOCATHODE EMITTERS

CROSS-REFERENCE TO RELATED APPLICATIONS

This application claims priority to the provisional patent application filed Sep. 27, 2019 and assigned U.S. App. No. 62/907,502, the disclosure of which is hereby incorporated by reference.

FIELD OF THE DISCLOSURE

This disclosure relates to semiconductor inspection.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. An arrangement of multiple semiconductor devices fabricated on a single semiconductor wafer may be separated into individual semiconductor devices.

Electron beams are used in a number of different applications during semiconductor manufacturing. For example, electron beams can be modulated and directed onto an electron-sensitive resist on a semiconductor wafer, mask, or other workpiece to generate an electron pattern on the workpiece. Electron beams also can be used to inspect a wafer by, for example, detecting electrons emerging or reflected from the wafer to detect defects, anomalies, or undesirable objects.

These inspection processes are used at various steps during a semiconductor manufacturing process to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

Photocathodes have been used to generate electron beams. A single light beam incident on a photocathode system can generate a single electron beam with high brightness that is capable of delivering high electron current density. Planar photocathode structures can be used for applications such as illumination of accelerators, electron microscopy, lithography tools, or inspection tools. For the lithography tools or inspection tools, the photogenerated electron beams may need to be focused to spots of a few nanometers size. Due to limitations of electron optics, the small spot requirement transfers to the initial spot size on the photocathode plane that may be limited to sub-wavelength values even for ultraviolet wavelengths.

Plasmonic structures with photocathodes were tried at the infrared wavelengths where the most common noble metals used for plasmonics, such as gold and silver, have high resonance. These structures show that plasmonic resonance can increase the quantum efficiency (QE) of photocathodes at visible or ultraviolet (120-700 nm) wavelengths. Although the QE increased, the final QE is relatively low even comparing to the QE of metals.

The brightness of the photocathode emitters depends on the photocathode material and the excitation wavelength. There tends to be a trade between QE and emittance. QE and emittance are optimized to achieve high brightness, such as by providing low emittance or low transverse energy (e.g., 0.3 eV maximum) and high QE (e.g., >1 uA/m W) or total current. For a certain photocathode, the transverse energy spread is fixed, so to achieve low emittance small spots need to be obtained at the photocathode surface. To focus to nanometer size electron beam spots, initial spots of approximately 100 nm may be needed due to the limitations of electron optics. Previously, plasmonic structures at infrared wavelengths have been used in order to achieve small spot sizes where noble metals have high resonance.

The disadvantage of this approach is that most photocathodes suitable for inspection systems have very low QE at infrared wavelengths because it involves a 2-4 photon photoemission process (e.g., $<10^{-5}$). As a result, only pAs of total current was achieved in previous efforts. This current is not suitable for high throughput electron beam inspection systems.

Improved photocathode emitters are needed.

BRIEF SUMMARY OF THE DISCLOSURE

A photocathode emitter is disclosed in a first embodiment. The photocathode emitter comprises a transparent substrate, a photocathode layer, and a plasmonic structure array disposed between the transparent substrate and the photocathode layer. The plasmonic structure is configured to operate at a wavelength from 193 nm to 430 nm.

The photocathode layer can include one or more of $Cs_2Te$, CsKTe, GaAs, GaN, CsI, CsBr, or an AlGaN(P) alloy. The transparent substrate can include one or more of ultraviolet fused silica, $CaF_2$, quartz, sapphire, $MgF_2$, or LiF. The plasmonic structure array can be fabricated of aluminum.

The plasmonic structure array can define a bullseye pattern. In an instance, the plasmonic structure array has a central aperture diameter from 50 nm to 100 nm.

The plasmonic structure array can define a C-aperture. In an instance, the C-aperture has an aperture width from 39 nm to 200 nm.

The photocathode emitter can include a cap layer disposed on a side of the photocathode layer opposite the plasmonic structure array. In an instance, the cap layer includes ruthenium.

A method is provided in a second embodiment. In the method, a light beam is directed at a photocathode emitter that includes a transparent substrate, a photocathode layer, and a plasmonic structure array disposed between the transparent substrate and the photocathode layer. The light beam has a wavelength from 193 nm to 430 nm. An electron beam is generated from the light beam using the plasmonic structure array of the photocathode emitter.

The wavelength can be from 193 nm to 365 nm or from 193 nm to 266 nm.

The photocathode layer can include one or more of $Cs_2Te$, CsKTe, GaAs, GaN, CsI, CsBr, or an AlGaN(P) alloy. The transparent substrate can include one or more of ultraviolet fused silica, $CaF_2$, quartz, sapphire, $MgF_2$, or LiF. The plasmonic structure can be fabricated of aluminum.

The plasmonic structure can define a bullseye pattern or a C-aperture.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein provide a plasmonic configuration attached to a photocathode in transmission mode operating at ultraviolet and visible wavelengths. In the embodiments disclosed herein, structures operate at wavelengths where the photocathode QE is maximized while enhancing the light transmission through plasmonic apertures to subwavelength spots. Tens of nAs per spot be can be produced this way (e.g., 1-100 nA or more), which was not previously possible. To achieve small laser spots on the photocathode plasmonic structures of subwavelength dimensions such as bowtie, bullseye, C-apertures, or other designs can be used. These metal structures serve as both a spot-confining structure and an electrical underlayer for biasing the photocathode.

The plasmonic structure array can confine the incident light at subwavelength sizes. For example, the plasmonic structure array may produce an electron beam of 100 nm diameter or less. The electron beam diameter can depend on factors such as the laser properties or structure geometry. The plasmonic apertures can have strong resonance at visible and ultraviolet wavelengths. The resonance can be where several well-developed photocathodes, such as $Cs_2Te$, CsKTe, GaAs, GaN, CsI, CsBr, or other materials, have high QE to develop very high brightness sources. Aluminum, other metals, or other materials with strong plasmonic resonance at ultraviolet and visible wavelengths can be used. The plasmonic structure array can operate at ultraviolet and visible wavelengths where commercial wavelengths are available, such as 193 nm, 213 nm, 266 nm, 257 nm, 365 nm, 305 nm, or 430 nm. To operate at these wavelengths, the plasmonic structure array may have dimensions near its fabrication limit.

Embodiments disclosed herein can operate at wavelengths that the photocathodes have demonstrated high QE. Small spots can be created to demonstrate high brightness emitters, scalable to multi electron beam arrangements.

Figure 1:
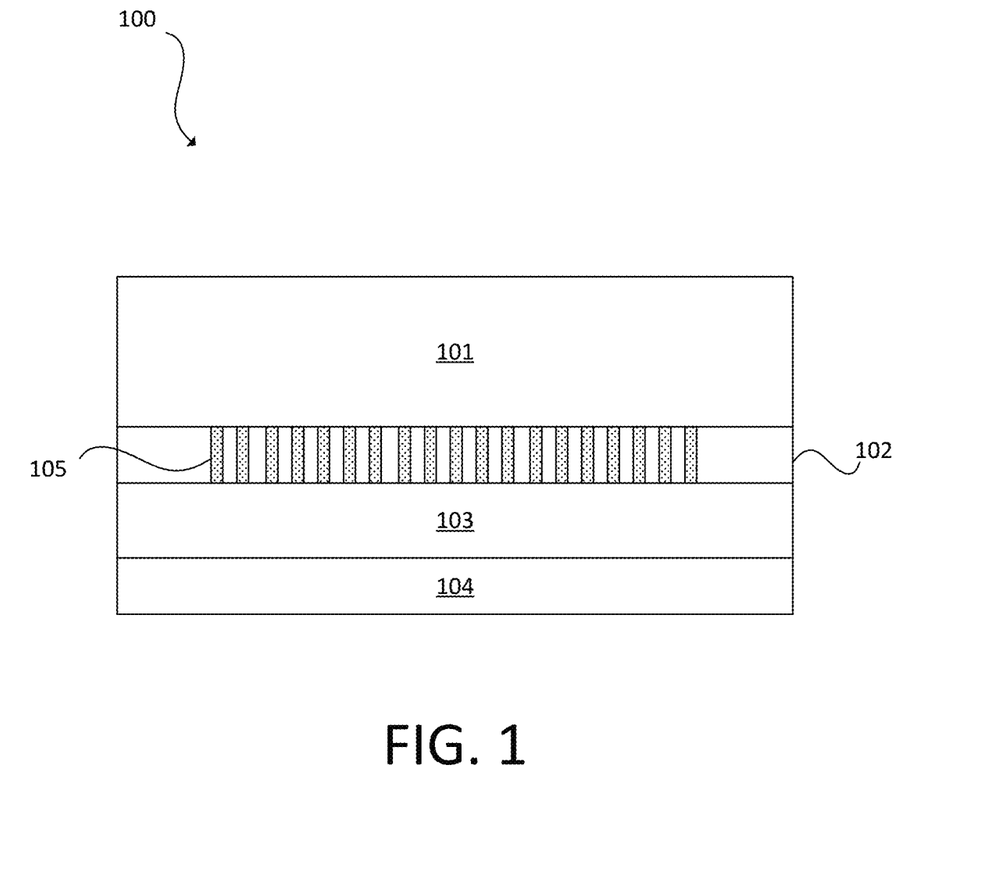
FIG. 1 is a cross-sectional view of a first embodiment of a photocathode in accordance with the present disclosure.

FIG. 1 is a cross-sectional view of a first embodiment of a photocathode 100. The photocathode 100 includes a transparent substrate 101, a photocathode layer 103, and a plasmonic structure array 102 disposed between the transparent substrate 101 and the photocathode layer 103. The photocathode layer 103 can include or otherwise be fabricated of one or more of $Cs_2Te$, CsKTe, GaAs, GaN, CsI, CsBr, an AlGaN(P) alloy, or other materials. The photocathode layer 103 can have high QE at ultraviolet and visible wavelengths. The use of high QE photocathodes at wavelengths of maximum efficiency can provide a high brightness emitter. Wavelength of maximum efficiency can refer to material properties based on absorption and emission efficiency. A light source (not illustrated) can direct light at the photocathode 100, which will produce one or more electron beams.

The transparent substrate 101 can include or otherwise be fabricated out of one or more of ultraviolet fused silica, $CaF_2$, quartz, sapphire, $MgF_2$, LiF, or other materials. The transparent substrate 101 can be transparent for ultraviolet and visible wavelengths.

The plasmonic structure array 102 can include metal material 105 (illustrated in FIG. 1 with the hatching). The metallic material 105 may be aluminum, metamaterials, or other materials. Aluminum may be used because it has improved plasmonic properties compared to gold or silver at the wavelengths used herein. Light can impinge the metallic material 105 to create resonance, such as at from 193 nm to 430 nm. This includes wavelengths at 193 nm, 213 nm, 266 nm, 257 nm, 365 nm, 305 nm, 430 nm, or ranges therebetween. The metallic material 105 can have strong resonance at ultraviolet and visible wavelengths. For example, strong resonance can correspond to a resonance peak. The metallic material 105 can be deposited on the transparent substrate 101. The plasmonic structure array 102 is configured to operate at a wavelength from 193 nm to 430 nm.

This plasmonic structure array 102 can be scalable to an large number of beams with subwavelength spots suitable for high throughput inspection systems.

The photocathode 100 can optionally include a cap layer 104 disposed on a side of the photocathode layer 103 opposite the plasmonic structure array 102. The cap layer 104 can include or otherwise be fabricated of ruthenium or other low work function metals. For example, the cap layer 104 can include a ruthenium alloy. The cap layer 104 can include a low work function metal for high lifetime operation.

The photocathode 100 also can optionally include a layer between the plasmonic structure array 102 and the photocathode layer 103 (not illustrated) that provides lattice matching between the plasmonic structure array 102 and the photocathode layer 103. This can improve growth of the various layers in the photocathode 100. The layer between the plasmonic structure array 102 and the photocathode layer 103 can be thin enough to allow the plasmonic field to penetrate the photocathode layer 103 and thick enough to produce high-quality growth of the photocathode layer 103. For example, the optional layer may be a few nanometers in thickness. In an instance, a few nanometers of tapered AlGaN can be used to lattice match with a photocathode layer 103 that includes GaN.

The thicknesses of the layers in the photocathode 100 can be optimized for electron emission. For example, the thicknesses of the layers in the photocathode 100 can be optimized to absorb incident light and avoid excess electron scattering during transport to the surface, such as by monitoring a factor during growth. The exact thickness and plasmonic structure dimensions can depend on the photocathode material and wavelength used for photoelectron emission. For example, dimensions can be optimized with simulations to increase resonance, which can be wavelength and structure dependent. Additionally, the plasmonic structure dimensions can be optimized for the target spot size on the photocathode.

Figure 2:
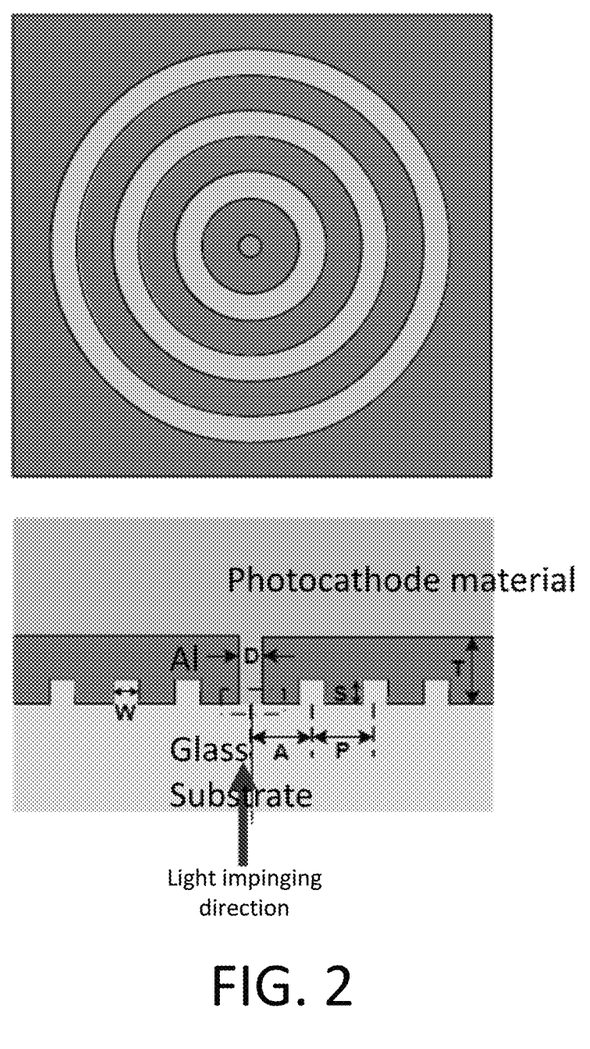
FIG. 2 is an example of a bullseye plasmonic photocathode.

Plasmonic apertures in the plasmonic structure array 102 help maximize the power delivered to the photocathode layer 103 while keeping the electric field spot size at subwavelength levels (e.g., ~100 nm). A schematic of the bullseye aperture plasmonic photocathode is shown in FIG. 2, which includes a top and corresponding cross-sectional view. In FIG. 2, D is the aperture diameter, A is the distance of groove to aperture, P is the groove pitch, S is the groove thickness, T is the metal thickness, and W is the groove width.

Figure 3:
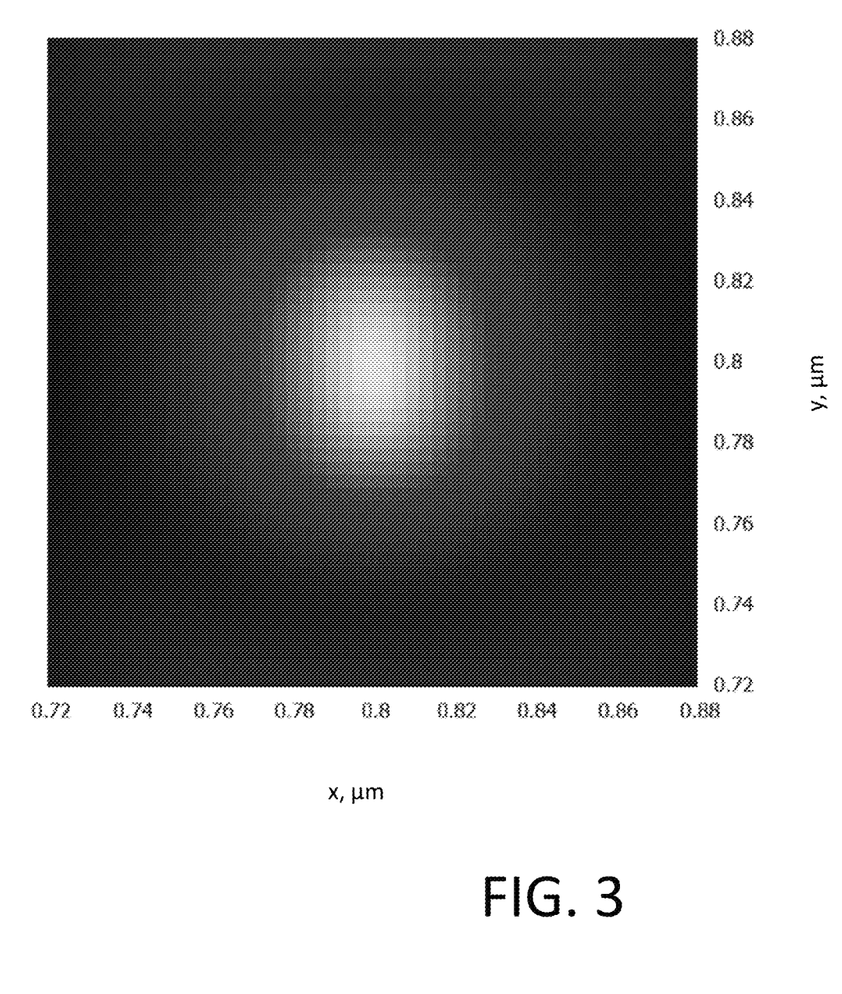
FIG. 3 is a simulation of electric field intensity at the aperture exit for a 100 nm aperture in a bullseye plasmonic photocathode.

The plasmonic structure array 102 can define a bullseye pattern. An example simulation of the electric field intensity at the aperture exit of the bullseye aperture plasmonic photocathode is shown in FIG. 3.

In the case of the bullseye pattern, grooves act as a cavity for surface plasmon polaritons (SPP), reflecting them back to the aperture. Field enhancement at the aperture happens when the distance between grooves P (i.e., groove pitch) is a multiple of SPP wavelength. The SPP wavelength at the interface between dielectric substrate and metal is:

$$\lambda_{SPP} = \lambda \sqrt{\frac{\varepsilon_{sub} + \varepsilon_{met}(\lambda)}{\varepsilon_{sub}\varepsilon(\lambda)}},$$

Thus, the wavelength of an l-th order resonance is:

$$\lambda_R = \frac{P}{l} \text{Re}\left\{\sqrt{\frac{\varepsilon_{sub}\varepsilon_{met}}{\varepsilon_{sub} + \varepsilon_{met}}}\right\}$$

In the formulas above, $\lambda_R$ is the wavelength at the l-th order resonance, $\lambda_{SPP}$ is the surface plasmon wavelength, $\lambda$ is the laser wavelength, $\varepsilon_{sub}$ is the substrate permittivity, $\varepsilon_{met}$ is the metal permittivity, P is the groove pitch, and l is the order resonance of the wavelength. $\varepsilon(\lambda)$ is the permittivity function of the wavelength. Re represents the real part of the equation.

Figure 4:
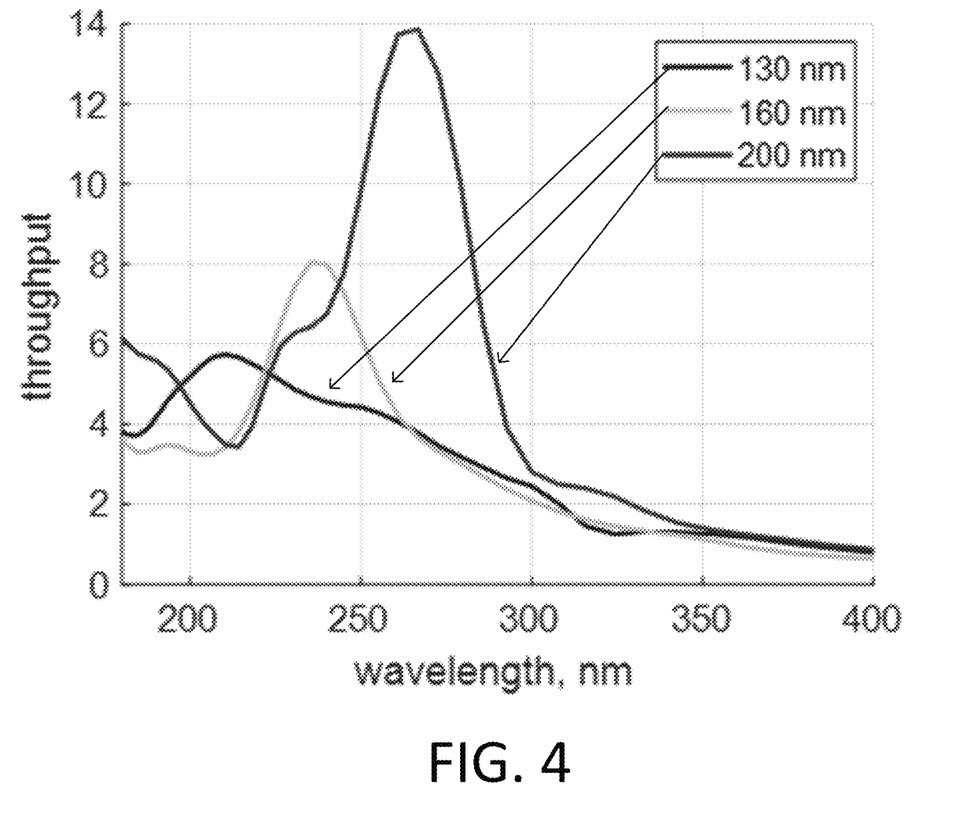
FIG. 4 is a chart showing throughput dependence on groove pitch for a bullseye plasmonic photocathode with throughput in arbitrary units.

The throughput dependence on P for bullseye aperture in vacuum is shown in FIG. 4. The results in FIG. 4 are for 130 nm, 160 nm, and 200 nm pitch sizes.

Generally, the metal (e.g., Al) film thickness T should be greater than double the skin depth, because a 100 nm spot size requires that the metal film thickness be greater than the skin depth. To concentrate a field to the central aperture, groove depth S should be on the order of, approximately equal to, or greater than the skin depth, while the grooves should not perforate the metal film throughout. In an instance, skin depth for Al in ultraviolet is ~15 nm. Groove pitch P can be of order of 100 nm to 200 nm for the structure to operate for the wavelengths of interest in ultraviolet. The central circular aperture diameter D can be from 50 nm to 100 nm because the electric field spot size is determined by this diameter.

Tables 1 and 2 show the range of parameters for bullseye aperture.

TABLE 1

Specifications for a Bullseye Aperture

| Operation wavelength (nm) | Central Aperture diameter D range (nm) | | Distance from the center to the 1st groove center A range (nm) | | Distance between the centers of adjacent grooves P range (nm) | | Groove width W range (nm) | |
|---|---|---|---|---|---|---|---|---|
| | from | to | from | to | from | to | from | to |
| 193 | 50 | 100 | 100 | 200 | 100 | 200 | 20 | 80 |
| 213 | 50 | 100 | 100 | 200 | 100 | 200 | 20 | 80 |
| 257 | 50 | 100 | 100 | 250 | 100 | 250 | 20 | 80 |
| 266 | 50 | 100 | 100 | 250 | 100 | 250 | 20 | 80 |
| 365 | 50 | 100 | 100 | 300 | 100 | 300 | 20 | 120 |
| 305 | 50 | 100 | 100 | 300 | 100 | 300 | 20 | 120 |
| 430 | 50 | 100 | 100 | 300 | 100 | 300 | 20 | 120 |

TABLE 2

Specifications for a Bullseye Aperture

| Operation wavelength (nm) | Groove depth S range (nm) | | Number of concentric grooves N range | | Aluminum thickness T range (nm) | | Semiconductor thickness range (nm) | |
|---|---|---|---|---|---|---|---|---|
| | from | to | from | to | from | to | from | to |
| 193 | 15 | 50 | 3 | 10 | 30 | 100 | 10 | 50 |
| 213 | 15 | 50 | 3 | 10 | 30 | 100 | 10 | 50 |
| 257 | 15 | 50 | 3 | 10 | 30 | 100 | 10 | 50 |
| 266 | 15 | 50 | 3 | 10 | 30 | 100 | 10 | 50 |
| 365 | 14 | 50 | 3 | 10 | 28 | 100 | 10 | 50 |
| 305 | 13 | 50 | 3 | 10 | 26 | 100 | 10 | 50 |
| 430 | 13 | 50 | 3 | 10 | 26 | 100 | 10 | 50 |

Figure 5:
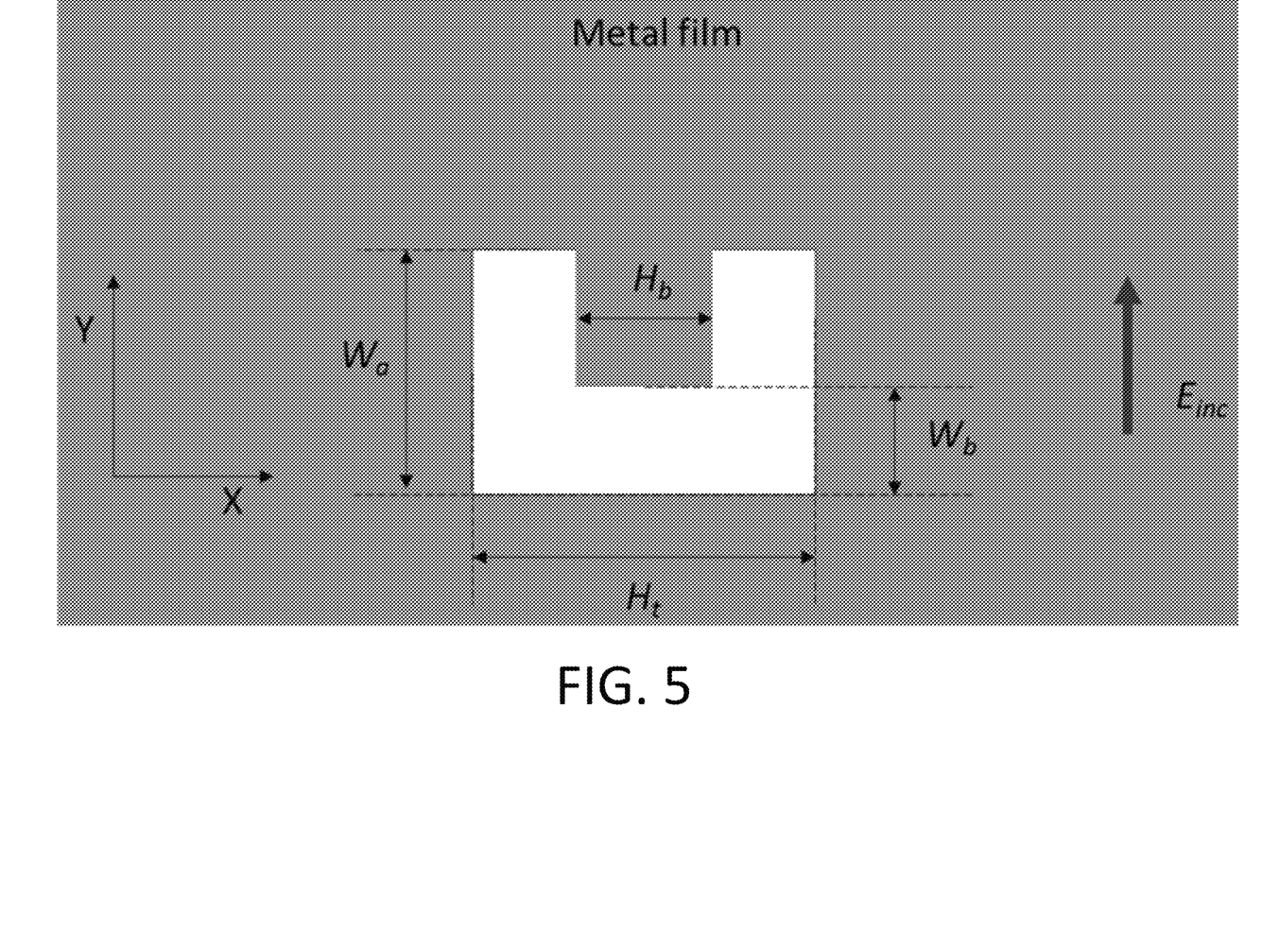
FIG. 5 is an exemplary geometry of a C-aperture plasmonic photocathode with the polarization of incident light ($E_{inc}$)

Similar specifications can be used with other plasmonic aperture shapes. For example, the plasmonic structure array 102 can define a C-aperture. In the case of the C-aperture the resonance position can be tuned by adjusting the aperture waist and arm to waist ratio (FIG. 5). In FIG. 5, Wa is the aperture arm, Wb is the aperture waist, Hb is the aperture tooth, and Ht is the aperture width.

Figure 6:
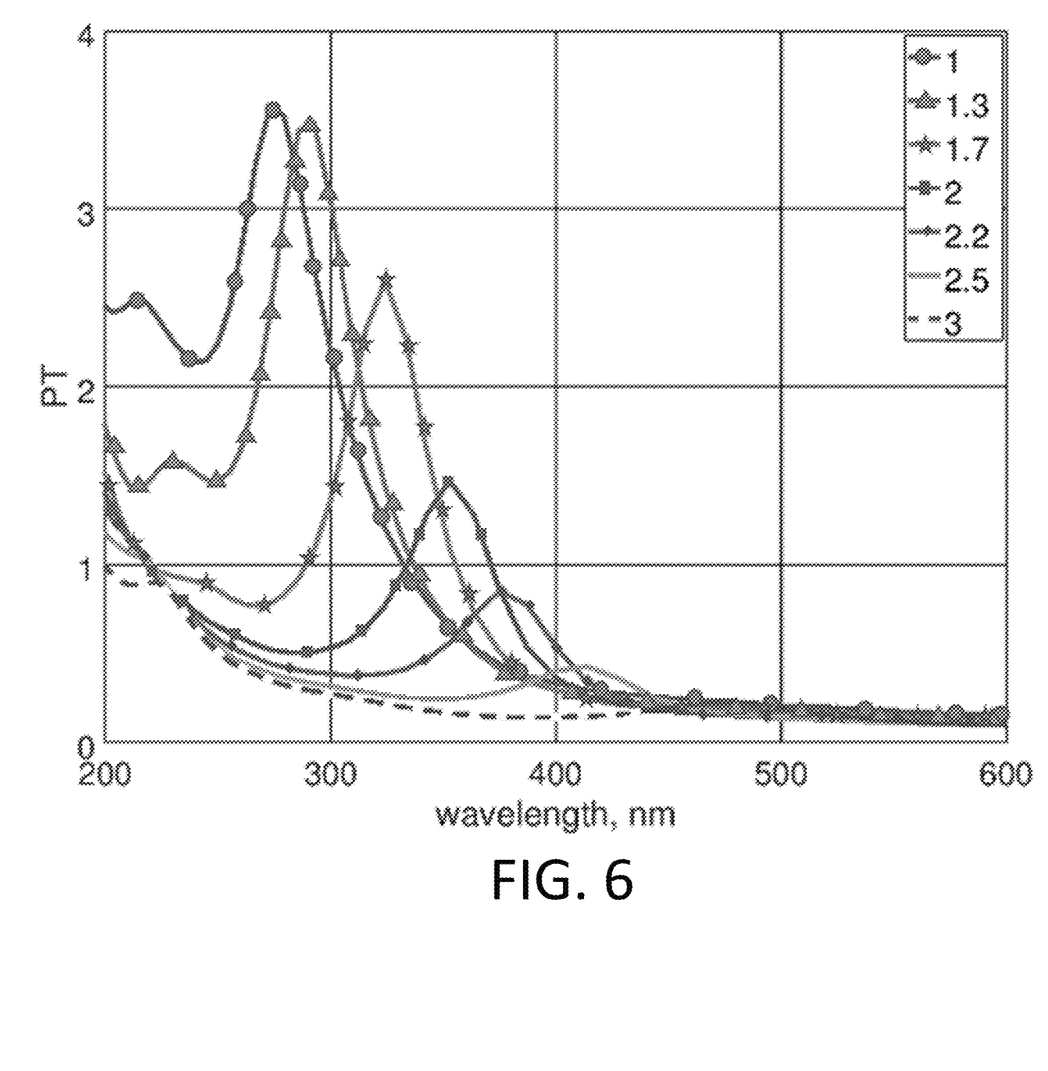
FIG. 6 is a chart showing resonance behavior of the C-aperture plasmonic photocathode with Wb=17 nm and the values positioned about each trend line.
Figure 7:
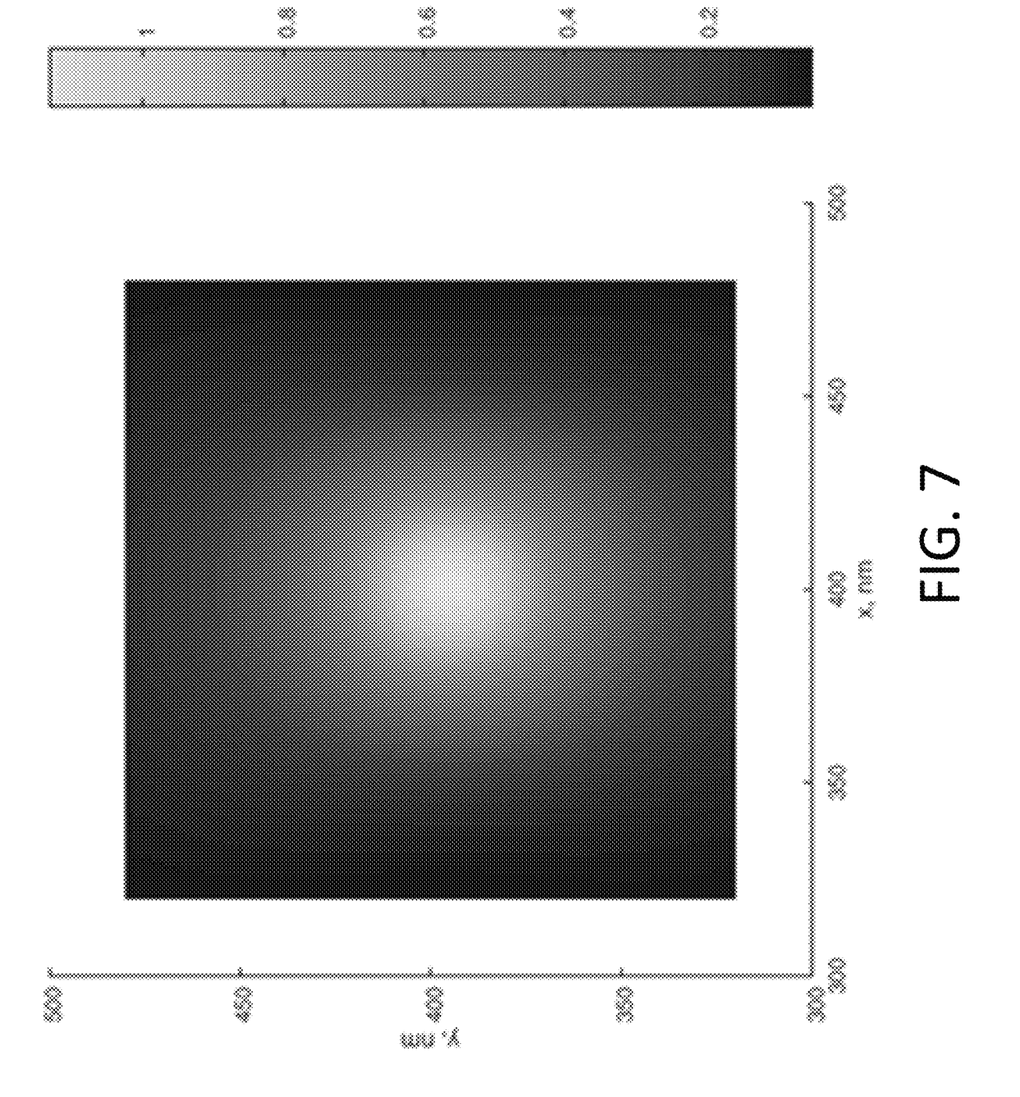
FIG. 7 is a diagram showing resonance behavior of the C-aperture plasmonic photocathode with Wb=17 nm

In particular for Wb=17 nm and 1<Wa/Wb<1.3, the resonance position is in the vicinity of 266 nm, while the power throughput is around 3.5 and the spot size is around 60 nm (FIGS. 6 and 7) for the incident light polarized along the aperture arms. For the polarization perpendicular to the arms, there is no resonance in the wavelength range of interest. In FIG. 6, the power throughput for the different Wa/Wb ratio is shown, as indicated in the legend. In FIG. 7, the squared electric field distributions at 30 nm from the aperture exit (in the transmission region) are shown for the first aperture resonance at Wa/Wb=1.3, spot size $FWHM_x$=55 nm, and $FWHM_y$=65 nm. FWHM represents full width half max. $FWHM_x$ is the full width half max in the x direction and $FWHM_y$ is the full width half max in the y direction.

Tables 3 and 4 show the range of parameters for C-aperture.

TABLE 3

Specifications for a C-aperture

| Operation wavelength | Aperture waist Wb range (nm) | | Aperture arm Wa range (nm) | | Aperture width Ht range (nm) | |
|---|---|---|---|---|---|---|
| (nm) | from | to | from | to | from | to |
| 257 | 13 | 20 | 13 | 30 | 39 | 60 |
| 266 | 13 | 20 | 13 | 30 | 39 | 60 |
| 365 | 27 | 33 | 27 | 120 | 60 | 150 |
| 305 | 30 | 40 | 30 | 160 | 70 | 200 |
| 430 | 30 | 40 | 30 | 160 | 70 | 200 |

TABLE 4

Specifications for a C-aperture

| Operation wavelength | Aperture tooth Hb range (nm) | | Aluminum thickness T range (nm) | | Semiconductor thickness range (nm) | |
|---|---|---|---|---|---|---|
| (nm) | from | to | From | to | from | to |
| 193 | | | 15 | 100 | 10 | 50 |
| 213 | | | 15 | 100 | 10 | 50 |
| 257 | 13 | 20 | 15 | 100 | 10 | 50 |
| 266 | 13 | 20 | 15 | 100 | 10 | 50 |
| 365 | 27 | 33 | 15 | 100 | 10 | 50 |
| 305 | 30 | 40 | 15 | 100 | 10 | 50 |
| 430 | 30 | 40 | 15 | 100 | 10 | 50 |

In a particular instance, the C-aperture has an aperture width from 39 nm to 200 nm.

In an embodiment, Hesselink's C-aperture can be used as an optical plasmonic structure and the photocathode is actually a tip.

Embodiments disclosed herein can produce an array of sub wavelength spot size electron beams of tens of nAs per beam (e.g., 100-300 nA), which can be used for high-throughput multi-beam inspection tools. Maximum transmission of light in subwavelength spots can be enabled, which can be used for high brightness electron emitters. The photocathode emitter can operate at wavelengths where several photocathodes have demonstrated high QE.

Scalability for efficient light distribution to multi-beam systems can be provided with the electron beams of tens of nAs per beam. These photocathodes can be compatible with commercially available illumination sources. A high QE can be provided at the range of wavelengths disclosed herein.

Figure 8:
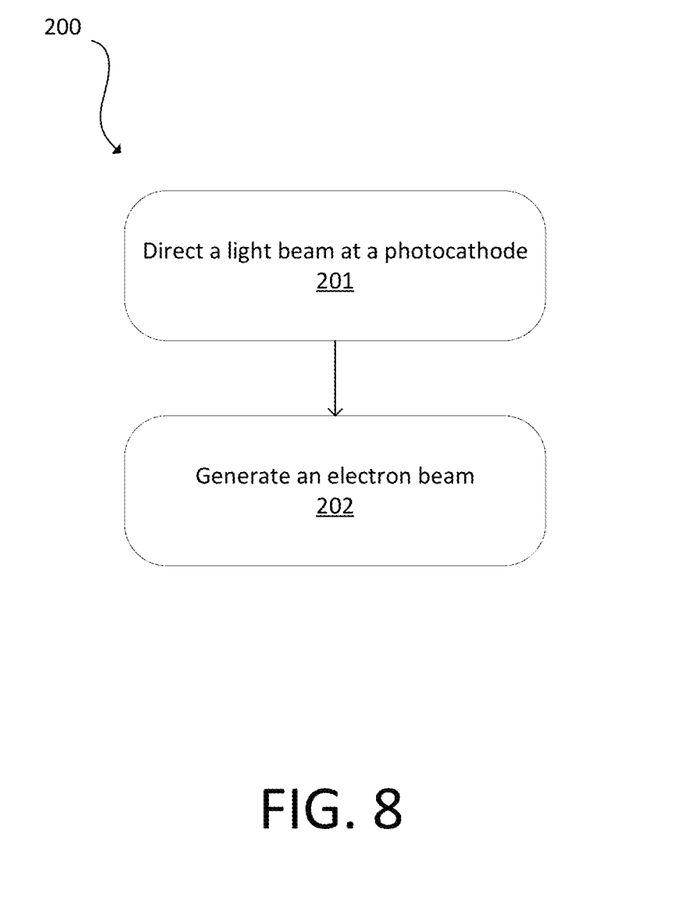
FIG. 8 is a flowchart of a method in accordance with the present disclosure.

FIG. 8 is a flowchart of a method 200. A light beam is directed at a photocathode emitter at 201. The photocathode emitter includes a transparent substrate, a photocathode layer, and a plasmonic structure array disposed between the transparent substrate and the photocathode layer, such as in the embodiments described herein. The light beam has a wavelength from 193 nm to 430 nm. For example, the wavelength can be from 193 nm to 365 nm or from 193 nm to 266 nm.

The photocathode layer can include one or more of $Cs_2Te$, CsKTe, GaAs, GaN, CsI, CsBr, or an AlGaN(P) alloy. The transparent substrate can include one or more of ultraviolet fused silica, $CaF_2$, quartz, sapphire, $MgF_2$, or LiF. The plasmonic structure can be fabricated of aluminum.

The plasmonic structure can define a bullseye pattern or a C-aperture.

An electron beam is generated from the light beam using the plasmonic structure array of the photocathode emitter at 202.

Figure 9:
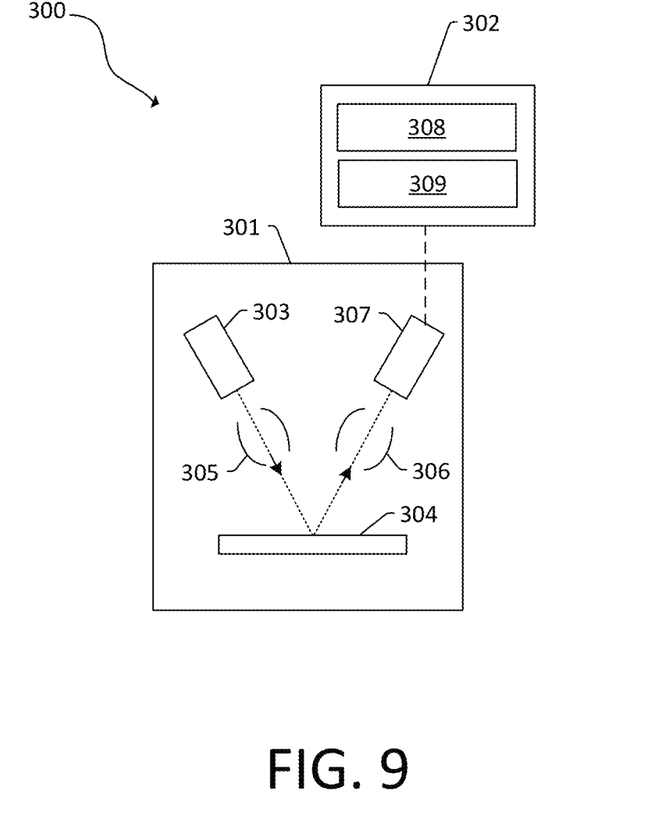
FIG. 9 is a block diagram of an embodiment of a system in accordance with the present disclosure.

FIG. 9 is a block diagram of an embodiment of a system 300. The system 300 includes a wafer inspection tool (which includes the electron column 301) configured to generate images of a wafer 304.

The wafer inspection tool includes an output acquisition subsystem that includes at least an energy source and a detector. The output acquisition subsystem may be an electron beam-based output acquisition subsystem. For example, in one embodiment, the energy directed to the wafer 304 includes electrons, and the energy detected from the wafer 304 includes electrons. In this manner, the energy source may be an electron beam source. In one such embodiment shown in FIG. 9, the output acquisition subsystem includes electron column 301, which is coupled to computer subsystem 302. A chuck (not illustrated) may hold the wafer 304.

As also shown in FIG. 9, the electron column 301 includes an electron beam source 303 configured to generate electrons that are focused to wafer 304 by one or more elements 305. The electron beam source 303 may include, for example, an embodiment of the photocathode 100 of FIG. 1. The one or more elements 305 may include, for example, a gun lens, an anode, a beam limiting aperture, a gate valve, a beam current selection aperture, an objective lens, and a scanning subsystem, all of which may include any such suitable elements known in the art.

Electrons returned from the wafer 304 (e.g., secondary electrons) may be focused by one or more elements 306 to detector 307. One or more elements 306 may include, for example, a scanning subsystem, which may be the same scanning subsystem included in element(s) 305.

The electron column also may include any other suitable elements known in the art.

Although the electron column 301 is shown in FIG. 9 as being configured such that the electrons are directed to the wafer 304 at an oblique angle of incidence and are scattered from the wafer 304 at another oblique angle, the electron beam may be directed to and scattered from the wafer 304 at any suitable angles. In addition, the electron beam-based output acquisition subsystem may be configured to use multiple modes to generate images of the wafer 304 (e.g., with different illumination angles, collection angles, etc.). The multiple modes of the electron beam-based output acquisition subsystem may be different in any image generation parameters of the output acquisition subsystem.

Computer subsystem 302 may be coupled to detector 307 such that the computer subsystem 302 is in electronic communication with the detector 307 or other components of the wafer inspection tool. The detector 307 may detect electrons returned from the surface of the wafer 304 thereby forming electron beam images of the wafer 304 with the computer subsystem 302. The electron beam images may include any suitable electron beam images. The computer subsystem 302 includes a processor 308 and an electronic data storage unit 309. The processor 308 may include a microprocessor, a microcontroller, or other devices.

It is noted that FIG. 9 is provided herein to generally illustrate a configuration of an electron beam-based output acquisition subsystem that may be used in the embodiments described herein. The electron beam-based output acquisition subsystem configuration described herein may be altered to optimize the performance of the output acquisition subsystem as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The computer subsystem 302 may be coupled to the components of the system 300 in any suitable manner (e.g., via one or more transmission media, which may include wired and/or wireless transmission media) such that the processor 308 can receive output. The processor 308 may be configured to perform a number of functions using the output. The wafer inspection tool can receive instructions or other information from the processor 308. The processor 308 and/or the electronic data storage unit 309 optionally may be in electronic communication with another wafer inspection tool, a wafer metrology tool, or a wafer review tool (not illustrated) to receive additional information or send instructions.

The computer subsystem 302, other system(s), or other subsystem(s) described herein may be part of various systems, including a personal computer system, image computer, mainframe computer system, workstation, network appliance, interne appliance, or other device. The subsystem(s) or system(s) may also include any suitable processor known in the art, such as a parallel processor. In addition, the subsystem(s) or system(s) may include a platform with high speed processing and software, either as a standalone or a networked tool.

The processor 308 and electronic data storage unit 309 may be disposed in or otherwise part of the system 300 or another device. In an example, the processor 308 and electronic data storage unit 309 may be part of a standalone control unit or in a centralized quality control unit. Multiple processors 308 or electronic data storage unit 309 may be used.

The processor 308 may be implemented in practice by any combination of hardware, software, and firmware. Also, its functions as described herein may be performed by one unit, or divided up among different components, each of which may be implemented in turn by any combination of hardware, software, and firmware. Program code or instructions for the processor 308 to implement various methods and functions may be stored in readable storage media, such as a memory in the electronic data storage unit 309 or other memory.

The system 300 of FIG. 9 is merely one example of a system that can use embodiments of the electron source 100 or embodiments of the method 200. The system 300 can operate at an ultra-high vacuum (UHV) environment or other environments. Embodiments of the electron source 100 may be part of a defect review system, an inspection system, a metrology system, or some other type of system. Thus, the embodiments disclosed herein describe some configurations that can be tailored in a number of manners for systems having different capabilities that are more or less suitable for different applications.

Photocathode embodiments disclosed herein can be used in reticle and wafer inspection systems; electron beam inspection systems for wafers or reticles using single or multiple electron sources; electron beam review systems for wafers or reticles using single or multiple electron sources; or electron beam metrology systems for wafers or reticles using single or multiple electron sources. Photocathode embodiments disclosed herein also can be used in systems that use electron sources to generate x-rays using single or multiple electron sources, such as those for metrology, review, or inspection of a wafer or reticle. For example, embodiments disclosed herein can be used in a multi-electron source inspection system or lithography system.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A photocathode emitter comprising:
   a transparent substrate;
   a photocathode layer;
   a plasmonic structure array disposed between the transparent substrate and the photocathode layer, wherein the plasmonic structure is configured to operate at a wavelength from 193 nm to 430 nm; and
   a cap layer disposed on a side of the photocathode layer opposite the plasmonic structure array.

2. The photocathode emitter of claim 1, wherein the photocathode layer includes one or more of $Cs_2Te$, CsKTe, GaAs, GaN, CsI, CsBr, or an AlGaN(P) alloy.

3. The photocathode emitter of claim 1, wherein the transparent substrate includes one or more of ultraviolet fused silica, $CaF_2$, quartz, sapphire, $MgF_2$, or LiF.

4. The photocathode emitter of claim 1, wherein the plasmonic structure array is fabricated of aluminum.

5. The photocathode emitter of claim 1, wherein the plasmonic structure array defines a bullseye pattern.

6. The photocathode of claim 5, wherein the plasmonic structure array has a central aperture diameter from 50 nm to 100 nm.

7. The photocathode emitter of claim 1, wherein the plasmonic structure array defines a C-aperture.

8. The photocathode of claim 7, wherein the C-aperture has an aperture width from 39 nm to 200 nm.

9. The photocathode emitter of claim 1, wherein the cap layer includes ruthenium.

10. The photocathode emitter of claim 1, wherein the wavelength is from greater than 400 nm to 430 nm.

11. A method comprising:
    directing a light beam at a photocathode emitter that includes a transparent substrate, a photocathode layer, a plasmonic structure array disposed between the transparent substrate and the photocathode layer, and a cap layer disposed on a side of the photocathode layer opposite the plasmonic structure array, wherein the light beam has a wavelength from 193 nm to 430 nm; and
    generating an electron beam from the light beam using the plasmonic structure array of the photocathode emitter.

12. The method of claim 11, wherein the wavelength is from 193 nm to 365 nm.

13. The method of claim 12, wherein the wavelength is from 193 nm to 266 nm.

14. The method of claim 11, wherein the photocathode layer includes one or more of $Cs_2Te$, CsKTe, GaAs, GaN, CsI, CsBr, or an AlGaN(P) alloy.

15. The method of claim 11, wherein the transparent substrate includes one or more of ultraviolet fused silica, $CaF_2$, quartz, sapphire, $MgF_2$, or LiF.

16. The method of claim 11, wherein the plasmonic structure is fabricated of aluminum.

17. The method of claim 11, wherein the plasmonic structure defines a bullseye pattern.

18. The method of claim 11, wherein the plasmonic structure defines a C-aperture.

19. The method of claim 11, wherein the wavelength is from greater than 400 nm to 430 nm.

* * * * *